United States Patent
Okamura (10) Patent No.: US 7,254,415 B2
(45) Date of Patent: Aug. 7, 2007

(54) PORTABLE WIRELESS TERMINAL, METHOD OF OUTPUTTING SOUND, AND METHOD OF PICKING UP SOUND

(75) Inventor: Haruhiko Okamura, Kanagawa (JP)

(73) Assignee: Sony Corporation (JP)

( * ) Notice: Subject to any disclaimer, the term of this patent is extended or adjusted under 35 U.S.C. 154(b) by 502 days.

(21) Appl. No.: 10/240,964

(22) PCT Filed: Feb. 4, 2002

(86) PCT No.: PCT/JP02/00889

§ 371 (c)(1),
(2), (4) Date: Oct. 7, 2002

(87) PCT Pub. No.: WO02/065738

PCT Pub. Date: Aug. 22, 2002

(65) Prior Publication Data

US 2003/0099367 A1    May 29, 2003

(30) Foreign Application Priority Data

Feb. 9, 2001    (JP) .............................. 2001-33841

(51) Int. Cl.
*H04M 1/00*    (2006.01)

(52) U.S. Cl. .............................. 455/556.1; 455/575.2; 381/74; 381/123

(58) Field of Classification Search ............. 455/431.1, 455/431.3, 431.2, 556.1, 575.2; 381/74, 381/123; 38/74

See application file for complete search history.

(56) References Cited

U.S. PATENT DOCUMENTS

| 5,978,689 | A | * | 11/1999 | Tuoriniemi et al. ....... 455/569.1 |
| 6,662,022 | B1 | * | 12/2003 | Kanamori et al. ........ 455/556.1 |
| 6,735,453 | B1 | * | 5/2004 | Bobisuthi et al. ......... 455/575.2 |
| 2002/0090982 | A1 | * | 7/2002 | Hollstrom et al. .......... 455/569 |

FOREIGN PATENT DOCUMENTS

WO    WO 99/03294    *    1/1999

* cited by examiner

*Primary Examiner*—Vivian Chin
*Assistant Examiner*—Corey Chau
(74) *Attorney, Agent, or Firm*—Lerner, David, Littenberg, Krumholz & Mentlik, LLP (57) ABSTRACT

A portable wireless terminal provides a signal output circuit for outputting an audio signal to a speaker or to earphones from an earphone jack via a plug, and a controller for controlling the signal output circuit to output an arbitrary audio signal or another audio signal to the speaker and/or the earphones at an arbitrary timing when the audio signal is being outputted to the speaker and/or the earphones. Thereby, an audio signal can be outputted to the desired speaker and/or the earphones that have been arbitrary selected by switching the signal output circuit without pulling the plug out of the earphone jack when the audio signal is being outputted to the speaker and/or the earphones.

4 Claims, 5 Drawing Sheets

PORTABLE WIRELESS TERMINAL, METHOD OF OUTPUTTING SOUND, AND METHOD OF PICKING UP SOUND

CROSS-REFERENCE TO RELATED APPLICATIONS

The present application is a national stage application under 35 U.S.C. § 371 of International Application No. PCT/JP02/00889, filed Feb. 4, 2002, which claims priority from Japanese Application No. P2001-033841, filed Feb. 9, 2001.

BACKGROUND OF THE INVENTION

1. Technical Field

This invention relates to a portable wireless terminal, a method of outputting sound and a method of picking up sound, and is suitably applied, for example, to a digital mobile phone having a music data reproducing function.

2. Background Art

Recently, there is a digital mobile phone in that music can be recorded for example in an internal memory as digital data, and the user can enjoy the music by reproducing the music data from the memory as a music player while he/her does not make a call at the place where he/she is.

In the above digital mobile phone, for example earphones are used to reproduce music data. The music data is reproduced from the memory in the state where a plug connected to the above earphones is inserted into an earphone jack provided on the digital mobile phone. The above reproduced music data is converted into an analog audio signal and transmitted to the earphones from the earphone jack via the plug. Thus music based on the audio signal is emitted from the above earphones.

Furthermore, if a call comes on the reproducing of the music data, the digital mobile phone informs the user of the call incoming by superimposing a signal for ringing tone on the audio signal corresponding to the above music data and transmitting them to the earphones, and ringing an incoming tone from the earphones along with music.

Thereby, even if a call comes on the reproducing of music data; the digital mobile phone can make the user speak over the phone with the other party by informing the user of the call incoming.

In this digital mobile phone, however, the earphone jack is a mechanical switch. If the earphones plug is inserted into the above earphone jack, only the earphones are forcedly made to work instead of a speaker provided on the digital mobile phone.

Therefore, in the digital mobile phone, if a call comes while listening to the music with the earphones, to speak by the phone with the other party, the user have to pull the earphones plug out of the earphone jack to make the speaker work. There has been a problem that it is bad in usability.

SUMMARY OF THE INVENTION

Description of the Invention

This invention has been done considering the above points and is proposing a portable wireless terminal, a method of outputting sound and a method of picking out sound in that the usability can be improved.

To obviate such problem according to this invention, a speaker for emitting a sound based on a predetermined audio signal, an earphone jack to insert so as to be able to pull out, a plug connected to earphones for emitting the sound based on the audio signal, signal output means for outputting the audio signal to the speaker or outputting the audio signal from the earphone jack to the earphones via the plug, and control means for controlling the signal output means to output the arbitrary audio signal or another audio signal to the specified speaker and/or earphones at arbitrary timing when in transmitting the arbitrary audio signal to the speaker and/or the earphones, are provided.

Therefore, when an audio signal is being outputted to the speaker and/or the earphones, the audio signal can be outputted to the arbitrary selected desired speaker and/or earphones by switching the signal output means to them without pulling the plug out of the earphone jack.

Furthermore, according to this invention, a main body microphone for picking up user's voice for call, an earphone jack to insert so as to be able to pull out, a plug connected to an external microphone for picking up the user's voice similarly to that, signal fetch means for fetching send voice signal obtained by picking up the user's voice by the main body microphone, or fetching send voice signal obtained by picking up the user's voice by the earphones, and control means for controlling the signal fetch means to fetch the send voice signal obtained by picking up the user's voice by the arbitrary main body microphone and/or external microphone when the plug is inserted into the earphone jack, are provided.

Thus, user's voice can be picked up for call via the main body microphone without pulling the plug out of the earphone jack.

DETAILED DESCRIPTION

Best Mode for Carrying out the Invention

An embodiment of this invention will be described in detail with reference to the accompanying drawings.

Figure 1:
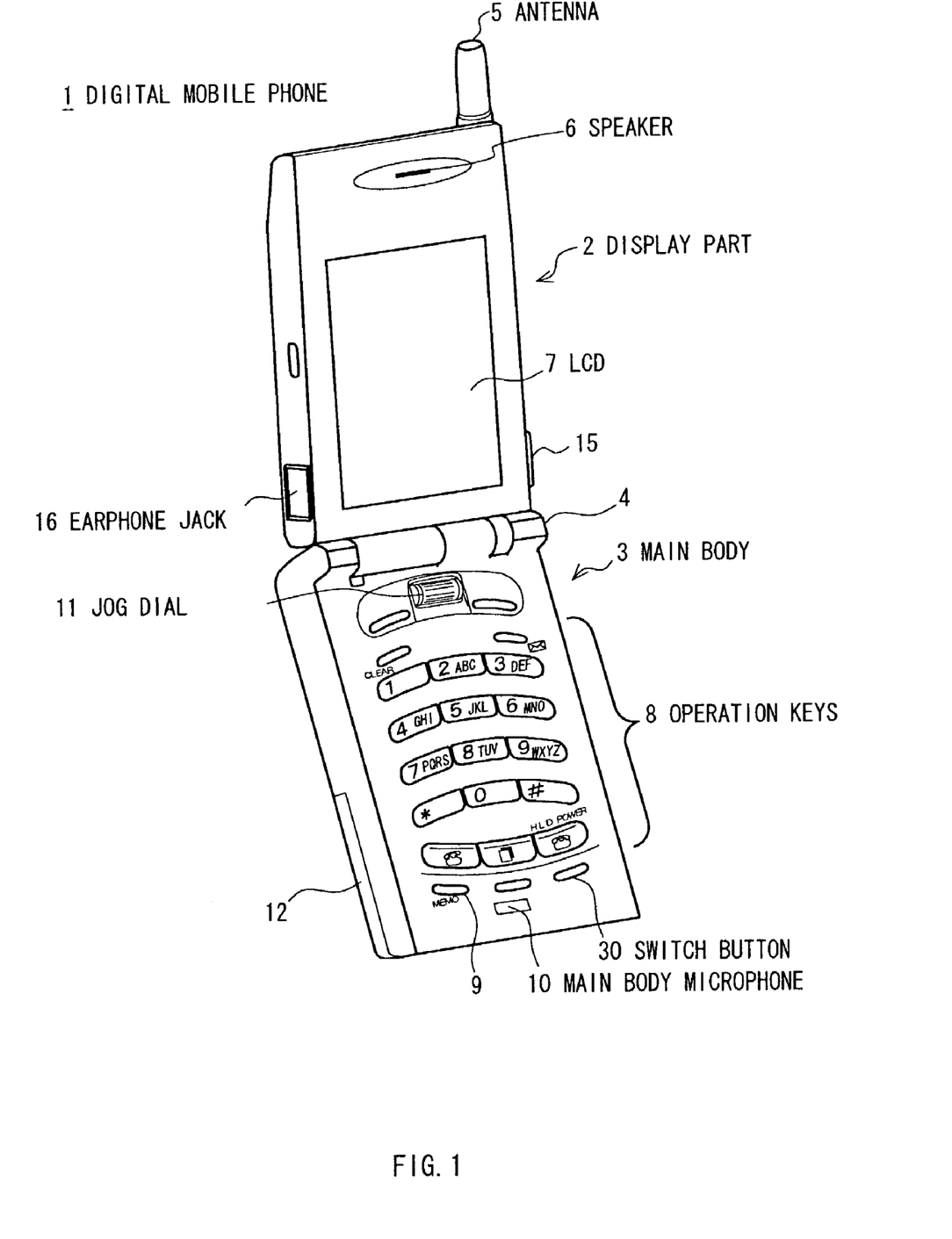
FIG. 1 is a schematic perspective view showing one embodiment of the external structure of a digital mobile phone according to this invention.

Referring to FIG. 1, a reference numeral 1 generally shows a digital mobile phone adopting the present invention. A display part 2 and a main body 3 are foldable via a hinge part 4.

On the right upper end of the display part 2, an antenna 5 for send/receive is provided so as to be pulled out/housed. Radio waves can be transmitted/received from a base station (not shown) via the above antenna 5.

At the center of the front upper end of the display part 2, a speaker 6 is provided. The voice of the other party on calling can be emitted by the above speaker 6.

Furthermore, on the display part 2, a liquid crystal display (LCD) 7 is provided at the lower part than the speaker 6. On the above LCD 7, the name or the mail address of the destination of an electronic mail registered as a mail address, the contents of an electronic mail, a simple homepage, an web page, etc. can be displayed in addition to the receiving state of radio waves, the residual amount of battery, the name or the telephone number of the other party registered as a telephone directory, originated history, etc.

On the other hand, on the front surface of the main body 3, operation keys 8 such as numeric keys of "0" to "9", a call originating key, a redial key, an on-hook/power key, a clear key, an electronic mail key are disposed. The user can enter various commands by means of the above operation keys 8.

Moreover, on the front surface of the main body 3, a memo button 9 and a microphone (hereinafter, this is referred to as main body microphone) 10 are provided at the lower part than the operation keys 8. The voice of the other party on calling can be recorded by the above memo button 9, and user's voice on calling is picked up by the main body microphone 10.

Furthermore, on the front surface of the main body 3, a rotary controller (hereinafter, this is referred to as jog dial) 11 that is freely turnable and can be freely depressed is provided in slightly projecting from the front surface of the main body 3. Scroll operation of the list of telephone directory or mail address, the contents of an electronic mail, etc., displayed on the LCD 7, turn over operation of a simple homepage or an web page, etc. will be executed according to the turning operation of the above jog dial 11, and a desired telephone number or mail address can be selectively specified from the list of the telephone directory or the mail address according to the depressing operation of the jog dial 11.

Figure 2:
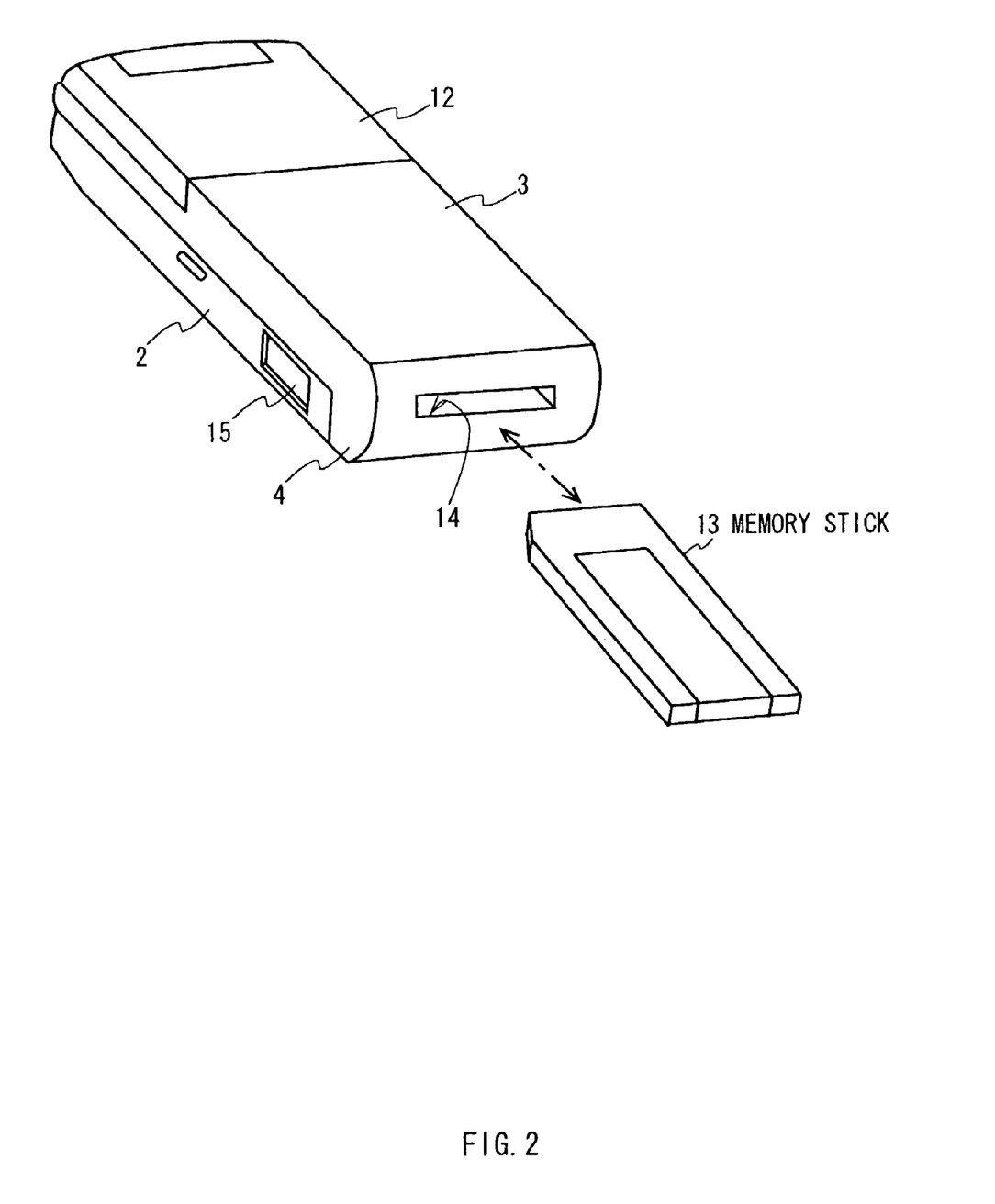
FIG. 2 is a schematic perspective view showing the structure of the back of the main body of the digital mobile phone.

In addition to this, as shown in FIG. 2, a battery pack 12 which is freely detachable is mounted on the back surface of the main body 3. If the portable wireless terminal 1 becomes into on state according to the depression of the on-hook/power key, power is supplied to each internal circuit from the above battery pack 12, and the portable wireless terminal 1 is activated into operable state.

On the other hand, on the hinge part 4, a memory stick slot 14 to load a memory stick (trademark by SONY Corporation) 13 into the main body 3 in freely ejectable is provided. If the memo button 9 is depressed, the voice of the other party on calling can be recorded in the memory stick 13, or various data such as an electronic mail, a simple homepage, music data can be recorded/reproduced according to user's operation.

Here, the memory stick 13 is a kind of flash memory card developed by the present applicant, SONY corporation. This memory stick 13 stores a flash memory device being a kind of electrically erasable and programmable read only memory (EEPROM) that is a nonvolatile memory electrically rewritable and erasable, in a small and thin plastic case for example 21.5 [mm] in length, 50 [mm] in width and 2.8 [mm] in thickness. It is writable and readable various data such as pictures, voice, music, via a 10-pin terminal.

Furthermore, the memory stick 13 adopts original serial protocol that can maintain compatibility between using devices, also against the change of specification of internal flash memory owing to becoming to bulk storage. For instance, it realizes high speed performance of the maximum write speed 1.5 [MB/s], the maximum read speed 2.45 [MB/s] as well as maintaining high reliability by providing an erroneous deletion prevention switch.

Since the digital mobile phone 1 is formed being loadable such memory stick 13, data sharing of various data such as music data can be attained with other electronic equipment via the above memory stick 13.

In this connection, the digital mobile phone 1 also can load the memory stick 13 in that music data has been previously recorded by external audio equipment (not shown). But since a connection terminal 15 to connect with external audio equipment or the like is provided on the right side of the display part 2 as shown in FIG. 1, so that also music data obtained from the external audio equipment via the connection terminal 15 can be recorded in the memory stick 13 in the memory stick slot 14.

By the way, in the digital mobile phone 1 (FIG. 1), an earphone jack 16 is provided on the left side surface of the display part 2. The plug 21 of a headset 20 that can be freely pulled out shown in FIG. 3 can be inserted into the above earphone jack 16.

Figure 3:
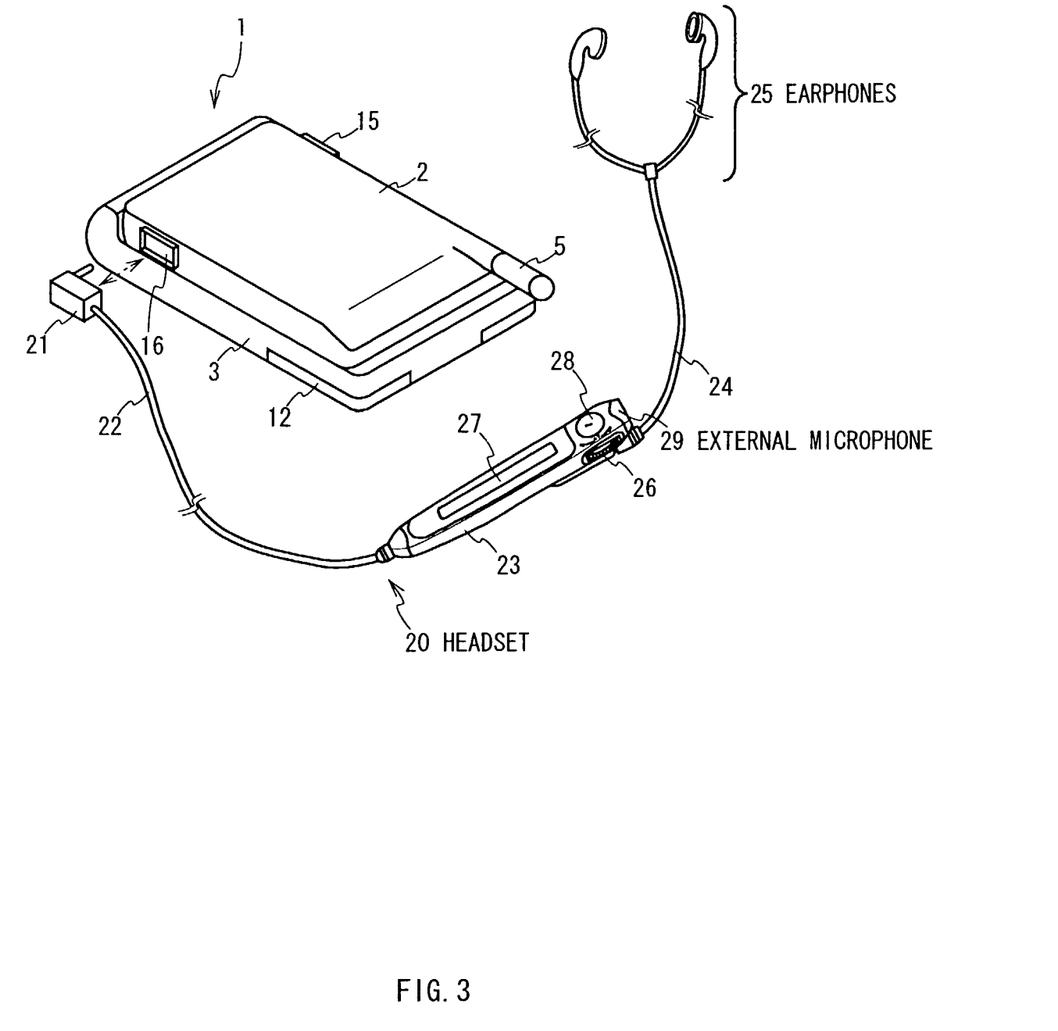
FIG. 3 is a schematic perspective view showing the structure of a headset.

In this case, as shown in FIG. 3, in the headset 20, a remote control 23 is connected to the plug 21 via a cable (hereinafter, this is referred to as plug side cable) 22, and the earphones 25 is connected to the above remote control 23 via a cable (hereinafter, this is referred to as earphone side cable) 24.

On the remote control 23 of the headset 20, a music data play/stop button 26, an LCD part 27 to display the title of music on reproducing, an on-hook/off-hook button 28, a microphone (hereinafter, this is referred to as external microphone) 29, etc. are provided.

Here, in the digital mobile phone 1, when the plug 21 of the headset 20 is not inserted into the earphone jack 16, the user can talk by the telephone by means of the above speaker 6 and main body microphone 10 by working them.

On the other hand, when the plug 21 of the headset 20 is inserted into the earphone jack 16, the digital mobile phone 1 works the earphones 25 and the external microphone 29 of the headset 20 instead of the speaker 6 and the main body microphone 10.

Accordingly, if the play/stop button 26 on the remote control 23 is depressed in the state where the plug 21 of the headset 20 is inserted into the earphone jack 16, the digital mobile phone 1 reproduces music data from the memory stick 13, converts the above reproduced music data into an audio signal and transmitting this to the earphones 25 from the earphone jack 16 sequentially via the plug 21, the plug side cable 22, the remote control 23 and the earphone side cable 24. Thereby, music based on the audio signal is emitted from the above earphones 25.

Furthermore, at this time, the digital mobile phone 1 also reproduces digital additional data formed by the title of the music etc., recorded along with the music data, from the memory stick 13. The above additional data reproduced is converted into an analog additional signal, and the signal is transmitted to the remote control 23 from the earphone jack 16 sequentially via the plug 21 and the plug side cable 22. Thus, the title of the music on reproducing or the like is displayed on the LCD part 27 of the above remote control 23 based on that additional signal.

In this manner, the user can enjoy music recorded in the memory stick 13 with the digital mobile phone 1.

Then, if a call comes on such reproducing of music data, the digital mobile phone 1 superimposes a signal for incoming tone on the audio signal based on that music data and transmitting them to the earphones 25 of the headset 20, and informing the user of the call incoming by emitting an incoming tone along with the music from the above earphones 25.

As a result, if the on-hook/off-hook button 28 on the remote control 23 is depressed by the user, the digital mobile phone 1 temporarily stops reproducing the music data, converts the voice data of the other party received at this time into a voice signal (hereinafter, this is referred to as receive voice signal), and transmits this to the earphones 25 from the earphone jack 16 sequentially via the plug 21, the plug side cable 22, the remote control 23 and the earphone side cable 24. Thus, the voice of the other party based on that receive voice signal is emitted from the above earphones 25.

Furthermore, at this time, the digital mobile phone 1 picks up user's voice by the external microphone 29 on the remote control 23, takes in thus obtained voice signal (hereinafter, this is referred to as send voice signal) from the earphone jack 16 sequentially via the plug side cable 22 and the plug 21 and transmitting that send voice signal from the antenna 5 to the base station.

In this manner, if a call comes, the digital mobile phone 1 enables a call between the user and the other party by means of the earphones 25 of the headset 20 and the external microphone 29 even if music data is being reproduced.

In this connection, while the user and the other party is talking by the telephone, the digital mobile phone 1 does not accept the depressing operation of the play/stop button 26 on the remote control 23. If the on-hook/off-hook button 28 on the above remote control 23 is depressed again and the call with the other party has finished, the digital mobile phone 1 accepts the depressing operation of the play/stop button 26 on the remote control 23.

Then, if the play/stop button 26 on the remote control 23 is depressed after the call finished, for instance, the digital mobile phone 1 reproduces the music data from the position where reproduction has stopped when the call started to make the user listen to the music again.

In addition to the above structure, in this digital mobile phone 1, as shown in FIG. 1, at the lower part of the front surface of the main body 3, a switch button 30 being a toggle switch to work either of the earphones 25 and the external microphone 29 of the headset 20 or the speaker 6 and the main body microphone 10 is provided for the input/output of voice signals for call (send voice signal and receive voice signal).

In this case, in the state where the plug 21 of the headset 20 is not inserted into the earphone jack 16 in a calling mode that the user and the other party is talking by the telephone (hereinafter, this is simply referred to as calling mode), the digital mobile phone 1 works only the speaker 6 and the main body microphone 10 and does not accept the depressing operation of the switch 30. Thereby, that the input/output of the voice signals (send voice signal and receive voice signal) are switched into the headset 20 by the depressing operation of the switch button 30 on the calling with the speaker 6 and the main body microphone 10 and the call is disconnected is prevented.

Since the digital mobile phone 1 does not accept the depressing operation of the switch button 30 while music data is being reproduced even if the plug 21 of the headset 20 is inserted into the earphone jack 16, it prevents that the music being listened with the earphones 25 is interrupted by switching into the speaker 6 by the depressing operation of the switch button 30.

On the contrary, in the state where the plug 21 of the headset 20 is inserted into the earphone jack 16 in the calling mode, the digital mobile phone 1 accepts the depressing operation of the switch button 30. So that, the earphones 25 and the external microphone 29 of the headset 20 or the speaker 6 and the main body microphone 10 alternately work by sequentially switched every time when the above switch button 30 is depressed.

Therefore, if the switch button 30 is depressed in the state where the plug 21 of the headset 20 is inserted into the earphone jack 16 and the earphones 25 and the external microphone 29 work in the calling mode, this digital mobile phone 1 works the speaker 6 and the main body microphone 10 instead of the above earphones 25 and external microphone 29 of the headset 20. Thus, the user holds the main body 3 and puts the speaker 6 his/her ear, and the user can talk by the telephone with the other party in the state where the main body microphone 10 is positioned near his/her mouse.

On the other hand, if the digital mobile phone 1 works the speaker 6 and the main body microphone 10 in the state where the plug 21 of the headset 20 is inserted into the earphone jack 16 in the calling mode, the digital mobile phone 1 works the earphones 25 and the external microphone 29 instead of the above speaker 6 and main body microphone 10 according to the depressing operation of the switch button 30. So that, the user can talk by the telephone with the headset 20.

In this manner, when the user requested calling by holding the main body 3 while reproducing of music data or calling with the headset 20 or when the user requested to freely use his/her both hands while he/she is talking by the telephone with holding the main body 3 in the state where the plug 21 of the headset 20 is inserted into the earphone jack 16, the earphones 25 and the external microphone 29 of the headset 20 can be easily switched to the speaker 6 and the main body microphone 10 and used by a simple operation only by depressing the switch button 30.

In this connection, if a call finished while the speaker 6 and the main body microphone 10 work in the state where the plug 21 of the headset 20 is inserted into the earphone jack 16, the digital mobile phone 1 automatically works the earphones 25 and the external microphone 29 instead of the speaker 6 and the main body microphone 10 at a time point where the above call finished. Thus, even if music data is reproduced after the call finished, the user can listen to the music via the headset 20 without performing switching operation from the speaker 6 and the main body microphone 10 to the earphones 25 and the external microphone 29. Moreover, even if a call came again while reproducing of that music data, the digital mobile phone 1 can accurately inform the user of this.

On the other hand, if a call came in the state where the plug 21 of the headset 20 is inserted into the earphone jack 16, the digital mobile phone 1 enables the call between the user and the other party not only by the depressing operation of the on-hook/off-hook button 28 on the remote control 23 but also by the depressing operation of the call originating key on the main body 3.

Furthermore, only if the plug 21 of the headset 20 is inserted into the earphone jack 16 in the calling mode, even if either of the earphones 25 and the external microphone 29 or the speaker 6 and the main body microphone 10 work, the digital mobile phone 1 accepts the depressing operation of both of the on-hook/off-hook button 28 on the remote control 23 of the headset 20 and the on-hook/power key on the main body 3, and disconnecting the call. Thus, lacking the operability is prevented.

Figure 4:
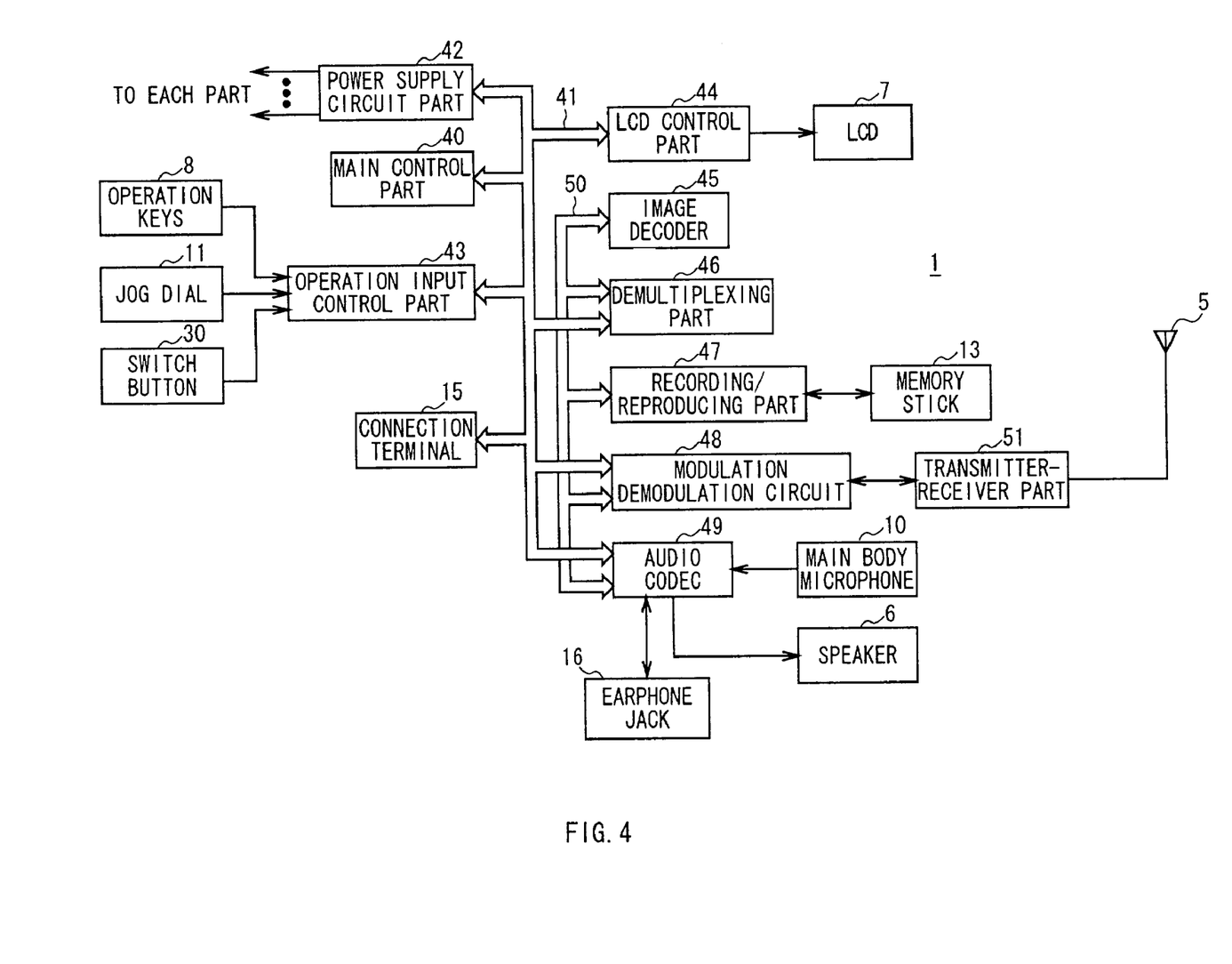
FIG. 4 is a block diagram showing the circuitry of the digital mobile phone.

Next, the circuitry of the digital mobile phone 1 will be described in detail with reference to FIG. 4. In this case, in the digital mobile phone 1, a power supply circuit part 42, an operation input control part 43, a connection terminal 15, a liquid crystal display (LCD) control part 44, an image decoder 45, a demultiplexing part 46, a recording/reproducing part 47, a modulation demodulation circuit part 48 and an audio CODEC 49 are connected to a main control part 40 that integratively controls each part of the display part 2 and the main body 3 via a main bus 41, and the image decoder 45, the demultiplexing part 46, the recording/reproducing part 47, the modulation demodulation circuit 48 and the audio CODEC 49 are mutually connected via a synchronous bus 50.

The main control part 40 is composed of a central processing unit (CPU), a read only memory (ROM), a random access memory (RAM), etc. If an on command is entered via the operation input control part 43 by the user's depression of the on-hook/power key, power obtained from the battery pack 12 (FIG. 2) is supplied to each part via the power supply circuit part 42. Thus, the digital mobile phone 1 is started into operable state.

In the state where the plug 21 of the headset 20 is not inserted into the earphone jack 16 in the calling mode, the main control part 40 convert a send voice signal obtained by picking up user's voice by the main body microphone 10 into voice data by the audio CODEC 49.

The main control part 40 subjects the voice data obtained by the audio CODEC 49 to spread spectrum processing in the modulation demodulation circuit 48, and then sequentially subjects it to digital-to-analog conversion processing and frequency modulation processing in a transmitter-receiver part 51, and transmitting thus obtained sending signal for send voice signal to the base station (not shown) via the antenna 5.

In addition to this, the main control part 40 amplifies a received signal for receive voice signal that was received by the antenna 5 in the calling mode in the transmitter-receiver part 51, sequentially subjects it to frequency modulation processing and analog-to-digital conversion processing, and then subjects it to back-spread spectrum in the modulation demodulation circuit part 48, converts thus obtained voice data into a receive voice signal by the audio CODEC 49 and transmitting this to the speaker 6, and emitting the voice of the other party based on the receive voice signal from the above speaker 6.

On the other hand, when in transmitting an electronic mail in a data communication mode, the main control part 40 subjects the text data of the electronic mail entered via the operation input control part 43 according to the operation of the operation keys 8 and the jog dial 11 to spread spectrum processing by the modulation demodulation circuit part 99, and then sequentially subjects it to digital-to-analog conversion processing and frequency modulation processing by the transmitter-receiver part 51, and transmits thus obtained sending signal for electronic mail to the base station via the antenna 5.

When in receiving an electronic mail in the data communication mode, the main control part 40 amplifies the received signal for electronic mail received by the antenna 5 by the transmitter-receiver part 51, sequentially subjects it to frequency modulation processing and analog-to-digital conversion processing, and then subjects it to back-spread spectrum processing by the modulation demodulation circuit part 48 and restoring to the original text data.

Then, the main control part 40 outputs the restored text data to the LCD 7 via the LCD control part 44 to display the electronic mail of the other party based on that text data on the above LCD.

In this connection, the main control part 40 can record the received electronic mail in the memory stick 13 via the recording/reproducing part 47 according to user's operation.

When in receiving for example a simple home page in the data communication mode, the main control part 40 amplifies the received signal for simple home page received by the antenna 5 by the transmitter-receiver part 51, sequentially subjects it to frequency modulation processing and analog-to-digital conversion processing, and then subjects it to spread spectrum processing by the modulation demodulation circuit part 48 and transmitting thus obtained multiplex data to the demultiplexing part 46.

Then, the main control part 40 separates that multiplex data into coded picture data and audio data by the demultiplexing part 46, and transmits the above coded picture data to the image decoder 45 via the synchronous bus 50 as well as transmitting the audio data to the audio CODEC 49 via the synchronous bus 50.

The main control part 40 decodes that coded picture data by the image decoder 45 by a decoding system corresponding to the specified coding system, and transmits thus obtained picture data to the LCD 7 via the LCD control part 44 to display the picture of the simple home page based on that picture data on the above LCD 7.

At this time, the main control part 40 converts the audio data into an audio signal by the audio CODEC 49 and outputting this to the speaker 6, and emitting an effective sound or the like of the simple home page based on that audio data from the above speaker 6 in synchronization with the above picture of the simple home page.

In this connection, also in this case, the main control part 40 can record the multiplex data of the simple home page in the memory stick 13 via the recording/reproducing part 47 according to user's operation similarly to the case of receiving an electronic mail.

In addition to this, in a data recording mode to record music data in the memory stick 13, the main control part 40 takes in the music data supplied from external audio equipment or the like (not shown) according to user's operation via the connection terminal 15, and records the above taken music data in the memory stick 13 via the recording/reproducing part 47.

By the way, in the earphone jack 16, a contact to detect the insertion of the plug 21 by that is conducted until the plug 21 of the headset 20 is inserted and if the above plug 21 is inserted, it is opened by pushed by that plug 21 (hereinafter, this is referred to as detection contact) is provided.

The audio CODEC 49 monitors the change of that voltage value while applying voltage of a predetermined value previously set to the detection contact in the earphone jack 16 (hereinafter, this is referred to as prescribed value).

Since the detection contact is conducted until the plug 21 of the headset 20 is inserted into the earphone jack 16, the audio CODEC 49 detects the voltage or the prescribed value applied to the above detection contact as it is.

On the contrary, if the plug 21 of the headset 20 is inserted into the earphone jack 16, the detection contact is opened. Thus, the audio CODEC 49 detects a lower value than the prescribed value (e.g. 0 [V]) as a voltage value applied to the above detection contact.

Therefore, if detecting the voltage of the prescribed value while applying the voltage to the detection contact in the earphone jack 16, the audio CODEC 49 decides that the plug 21 of the headset 20 is not inserted into the above earphone jack 16, and informs the main control part 40 of that decision result.

If detecting that the voltage applied to the detection contact in the earphone jack 16 was lowered to less than the prescribed value, the audio CODEC 49 decides that the plug 21 of the headset 20 was inserted into the above earphone jack 16, and informs the main control part 40 of that decision result.

The main control part 40 recognizes whether or not the plug 21 of the headset 20 is inserted into the earphone jack 16 based on the decision result informed from the audio CODEC 49.

In the audio CODEC 49, a switching device (not shown) for switching which of the earphones 25 and the external microphone 29 of the headset 20, and the speaker 6 and the main body microphone 10 should be connected to output a receive voice signal and to input a send voice signal is provided.

Thus, while that the plug 21 of the headset 20 is not inserted into the earphone jack 16 is recognized based on the decision result given from the audio CODEC 49, the main control part 40 connects the speaker 6 and the main body microphone 10 to that audio CODEC 49 by the switching device. Thereby, a call (including call incoming, the sound emitting of an effective sound of a simple home page or the like) by means of the above speaker 6 and main body microphone 10 is enabled.

Furthermore, if recognizing that the plug 21 of the headset 20 was inserted into the earphone jack 16 is recognized based on the decision result given from the audio CODEC 49, the main control part 40 connects the earphones 25 and the external microphone 29 of the headset 20 to that audio CODEC 49 by the switching device.

Thereby, if a reproducing command is entered according to the depressing operation of the play/stop button 26 on the remote control 23 by the user in the state where the plug 21 of the headset 20 is inserted into the earphone jack 16, the main control part 40 takes in that reproducing command from the above remote control 23 sequentially via the plug side cable 22, the plug 21, the earphone jack 16 and the audio CODEC 49, and reproduces music data from the memory stick 13 via the recording/reproducing part 47 based on the above taken reproducing command, converts the above reproduced music data into an audio signal by the audio CODEC 49 and transmitting this to the headset 20 from the earphone jack 16.

If a call comes while such reproducing of the music data, the main control part 40 superimposes a signal for call incoming on the audio signal and transmitting them to the headset 20 from the audio CODEC 49, and informing the user of the call incoming while making him/her listen to the music.

Here, if a call comes in the state where the plug 21 of the headset 20 is inserted into the earphone jack 16, the main control part 40 accepts the depressing operation of the switch button 30 during from the above time point that the call came until this call is finished.

If the switch button 30 is depressed while the call with the headset 20, according to that, the main control part 40 connects the speaker 6 and the main body microphone 10 to the audio CODEC 49 instead of the earphones 25 and the external microphone 29 of the headset 20 by the switching device. Thus, the voice of the other party that was emitted from the earphones 25 is emitted from the speaker 6, and user's voice picked up via the external microphone 29 is picked up via the main body microphone 10.

Moreover, if after switching to the earphones 25 and the external microphone 29 to work the speaker 6 and the main body microphone 10, the switch button 30 is depressed again, according to this, the main control part 40 connects the earphones 25 and the external microphone 29 to the audio CODEC 49 instead of the speaker 6 and the main body microphone 10 by the switching device. Thereby, the voice of the other party emitted from the above speaker 6 is emitted from the earphones 25 and user's voice picked up via the main body microphone 10 is picked up via the external microphone 29.

In this manner, during the time period from the time point that a call came in the state where the plug 21 of the headset 20 is inserted into the earphone jack 16 until the call by this call incoming is finished, the main control part 40 can work the earphones 25 and the external microphone 29 or the speaker 6 and the main body microphone 10 by sequentially alternately switching them every time when the switch button 30 is depressed.

In this connection, if after starting a call in the state where the plug 21 of the headset 20 is inserted into the earphone jack 16, the on-hook/off-hook button 28 on the remote control 23 is depressed by the user while working the speaker 6 and the main body microphone 10 and an off-hook (call terminating) command is entered, the main control part 40 finishes the call according to this. At the same time, the main control part 40 connects the earphones 25 and the external microphone 29 to the audio CODEC 49 instead of the speaker 6 and the main body microphone 10 by the switching device.

Practically, the main control part 40 executes such input/output switching processing of a send voice signal and a receive voice signal according to a switching processing program that has been previously stored in the internal ROM.

Figure 5:
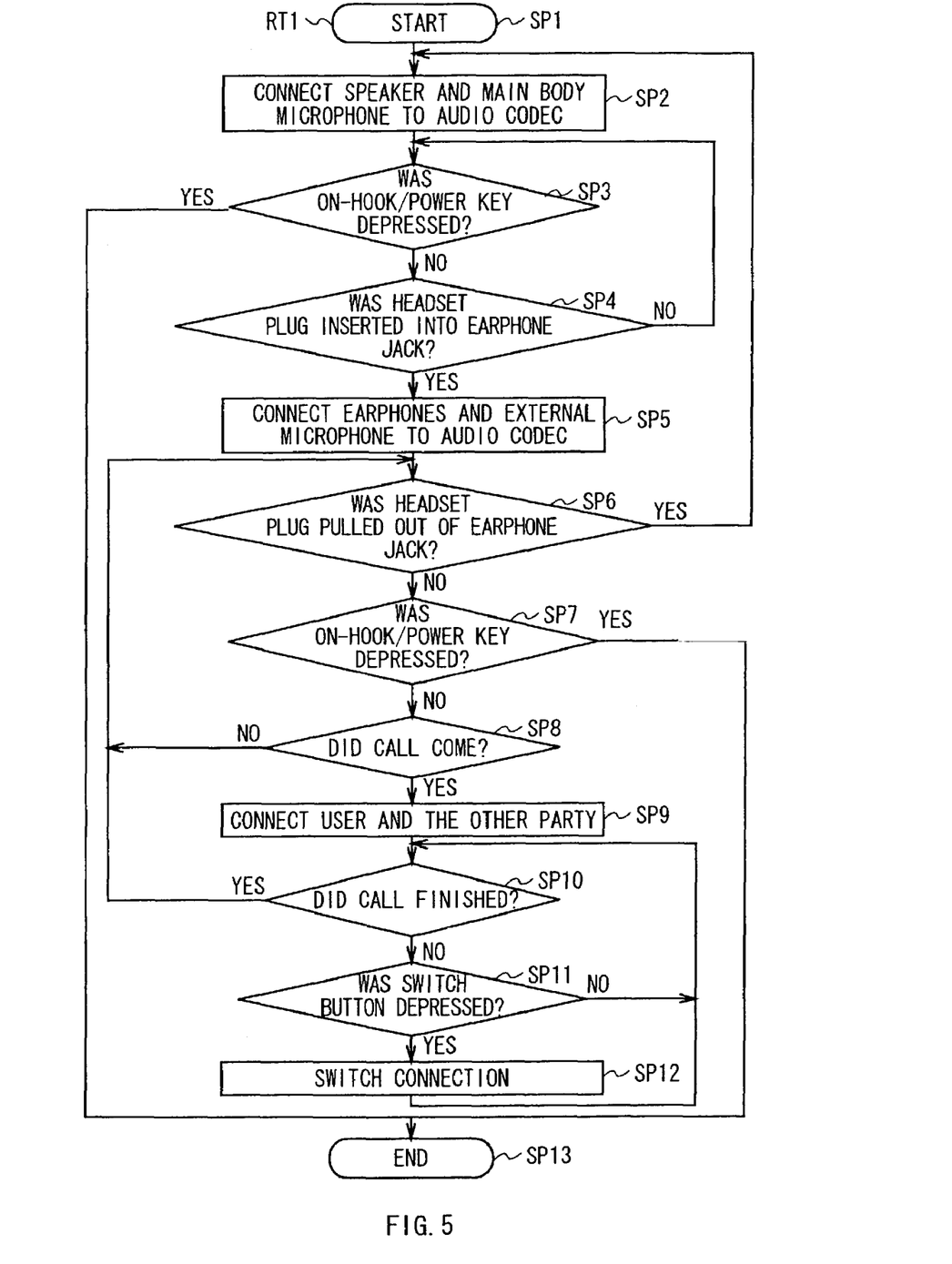
FIG. 5 is a flowchart showing the input-output switching processing procedure of a voice signal.

That is, to cite an example, if explaining a case where the digital mobile phone 1 became into an operable state according to the depression of the on-hook/power key when the plug 21 of the headset 20 is not inserted into the earphone jack 16, and then a call came while the reproducing of music data by means of the headset 20, the main control part 40 enters switching processing procedure RT1 shown in FIG. 5 from step SP1 and proceeds to the next step SP2 according to a switching processing program that was transferred from the internal ROM to the similarly-internal RAM and developed.

In step SP2, the main control part 40 connects the speaker 6 and the main body microphone 10 to the audio CODEC 49 by the switching device according to the decision result that the plug 21 of the headset 20 is not inserted into the earphone jack 16 by the audio CODEC 49, and it proceeds to step SP3.

In step SP3, the main control part 40 decides whether or not the on-hook/power key was depressed.

Obtaining a negative result in this step SP3 means that the digital mobile phone 1 is being used in call waiting, a call between the user and the other party, send/receive of an electronic mail, etc, in the state where the plug 21 of the headset 20 is not inserted into the earphone jack 16. At this time, the main control part 40 proceeds to step SP4 to decide whether or not the plug 21 of the headset 20 was inserted into the earphone jack 16.

Obtaining a negative result in this step SP4 means that the digital mobile phone 1 is being used without using the headset 20 since the plug 21 of the headset 20 is not inserted into the earphone jack 16. At this time, the main control part 40 returns to step SP3 and repeats the processing loop of steps SP4-SP3-SP4 until the on-hook/power key is depressed and the digital mobile phone 1 becomes into an off state, to wait that the headset 20 is used.

On the contrary, obtaining an affirmative result in step SP4 means that the plug 21 of the headset 20 was inserted into the earphone jack 16 for example to listen music by means of the headset 20 and this is recognized according to the decision result given from the audio CODEC 49. At this time, the main control part 40 proceeds to step SP5 to connect the earphones 25 and the external microphone 29 to the audio CODEC 49 by the switching device, and then proceeds to step SP6.

In step SP6, the main control part 40 decides whether or not the plug 21 of the headset 20 was pulled out of the earphone jack 16.

Obtaining a negative result in this step SP6 means that for example the user is listening to music reproduced from the memory stick 13 by means of the headset 20. At this time, the main control part 40 proceeds to step SP7 to decide whether or not the on-hook/power key was depressed.

Obtaining a negative result in step SP7 means that for example the user is continuously listening to the music reproduced from the memory stick 13 by means of the headset 20. At this time, the main control part 40 proceeds to step SP8 to decide whether or not a call came.

Obtaining a negative result in step SP8 means that there is no call incoming at this time point. At this time, the main control part 40 returns to step SP6 and repeats the processing loop of steps SP8-SP6-SP7-SP8 to wait a call incoming until the plug 21 of the headset 20 is pulled out of the earphone jack 16 or the on-hook/power key is depressed and the digital mobile phone 1 becomes into an off state.

On the contrary, obtaining an affirmative result in step SP8 means that a call came while for example the user was listening to the music by means of the headset 20. At this time, the main control part 40 proceeds to step SP9 to enable a call between the user using the headset 20 and the other party according to the depression of the on-hook/off-hook button 28 on the remote control 23 or the call originating key on the main body 3 by the user, and then it proceeds to the next step S510 to decide whether or not the call finished.

Obtaining a negative result in step S510 means that there is a possibility that the user depresses the switch button 30 on the main body 3 while the call with the other party. At this time, the main control part 40 proceeds to step SP11 to decide whether or not the user depressed the switch button 30.

Obtaining a negative result in step SP11 means that although the user does not depress the switch button 30 at this time point, there is a possibility that the user depresses the switch button 30 till he/she finishes the call. At this time, the main control part 40 returns to step S510, and then repeats the processing loop of steps SP11-S510-SP11 until the call between the user and the other party is finished to wait the depression of the switch button 30.

On the contrary, obtaining an affirmative result in step SP11 means that the user depressed the switch button 30 to talk by the telephone by means of the speaker 6 and the main body microphone 10. At this time, the main control part 40 proceeds to step SP12 to connect the speaker 6 and the main body microphone 10 to the audio CODEC 49 instead of the earphones 25 and the external microphone 29 by the switching device and to make the user continuously talk by the telephone with the other party by means of that speaker 6 and main body microphone 10, and returning to step S510.

Then, the main control part 40 repeats the processing loop of steps S510-SP11-SP12-S510 until the on-hook/off-hook button 28 on the remote control 23 or the on-hook/power key on the main body 3 is depressed by the user and the call is finished, to sequentially work the speaker 6 and the main body microphone 10 or the earphones 25 and the external microphone 29 by sequentially alternately switching every time when the switch button 30 is depressed.

Thereafter, if the call is finished by that the on-hook/off-hook button 28 on the remote control 23 or the on-hook/power key on the main body 3 was depressed by the user and the main control part 40 obtains an affirmative result in step S510, the main control part 40 returns to step SP6 and repeats again the processing loop of steps SP8-SP6-SP7-SP8 according to user's operation, for instance, until the plug 21 of the headset 20 is pulled out of the earphone jack 16 while the reproducing of the music data from the memory stick 13 or the on-hook/power key is depressed and the digital mobile phone 1 becomes into an off state.

Then, obtaining an affirmative result in step SP7 means that the on-hook/power key was depressed by the user and the digital mobile phone 1 became into an off state. At this time, the main control part 40 proceeds to step SP13 and terminating the switching processing procedure RT1.

In this connection, obtaining an affirmative result in step SP6 means that for example the reproducing of music data by means of the headset 20 was finished and the plug 21 of the headset 20 was pulled out of the earphone jack 16. At this time, the main control part 40 returns to step SP2.

On the other hand, obtaining an affirmative result in step SP3 means that the on-hook/power key was depressed by the user and the digital mobile phone 1 became into an off state. At this time, the main control part 40 proceeds to step SP13 and terminating the switching processing procedure RT1.

In the above configuration, in this digital mobile phone 1, the switch button 30 is provided on the main body 3, and when the user talks by the telephone in the state where the plug 21 of the headset 20 is inserted into the earphone jack 16, the earphones 25 and the external microphone 29 of the above headset 20 or the speaker 6 and the main body microphone 10 of the digital mobile phone 1 are worked by switching according to the depressing operation of that switch button 30.

Accordingly, in this digital mobile phone 1, even if the plug 21 of the headset 20 is inserted into the earphone jack 16, when the user requested to talk by the telephone by means of the speaker 6 and the main body microphone 10 while holding the main body 3, the user can use the digital mobile phone 1 by easily switching the state where the earphones 25 and the external microphone 29 of the headset 20 are worked into the state where the speaker 6 and the main body microphone 10 are worked only by depressing the switch button 30 without pulling the plug 21 out of the above earphone jack 16.

Furthermore, in the digital mobile phone 1, if the plug 21 of the headset 20 is inserted into the earphone jack 16, when the user requested to use both hands while talking by the telephone by means of the speaker 6 and the main body microphone 10 or the like, the user can use the digital mobile phone 1 by easily switching the state where the speaker 6 and the main body microphone 10 are worked into the state where the earphones 25 and the external microphone 29 of the headset 20 are worked only by depressing the switch button 30.

In this connection, as a conventional digital mobile phone, in the case where when the user is talking by the telephone in the state where the earphones plug is inserted into the earphone jack, it is necessary to pull the plug out of the earphone jack to work the speaker instead of the above earphones, there has been necessity to frequently perform inserting/pulling out the plug as the number of times of switching such function is large.

On the contrary, according to the present embodiment, the switch button 30 is provided to switch which of the earphones 25 and the external microphone 29, and the speaker 6 and the main body microphone 10 should be worked when the user is talking by the telephone in the state where the plug 21 of the headset 20 is inserted into the earphone jack 16. Therefore, wear of the above earphone jack 16 and the plug 21 of the headset 20 or the like can be minimized comparing with the conventional digital mobile phone.

According to the above configuration, the switch button 30 is provided on the main body 3. And when the user talks by the telephone in the state where the plug 21 of the headset 20 is inserted into the earphone jack 16 and the earphones 25 and the external microphone 29 are worked, the speaker 6 and the main body microphone 10 are worked instead of the above earphones 25 and external microphone 29 according to the depressing operation of that switch button 30. Thereby, the call can be easily switched from the call by means of the headset 20 to the call while holding the main body 3 without pulling the plug 21 out of the earphone jack 16. Thus, a digital mobile phone in which the usability can be improved can be realized.

In the aforementioned embodiment, it has dealt with the case where either of the earphones 25 and the external microphone 29 of the headset 20 or the speaker 6 and the main body microphone 10 are worked according to the depressing operation of the switch button 30. However, this invention is not only limited to this but also when the switch button 30 was depressed in the state where either of the earphones 25 and the external microphone 29 or the speaker 6 and the main body microphone 10 are working, both of the above earphones 25 and external microphone 29, and speaker 6 and main body microphone 10 may be worked, or they may be worked by arbitrary combination of, for instance, the external microphone 29 and the speaker 6 among the earphones 25, the external microphone 29, the speaker 6 and the main body microphone 10.

In this connection, when the user is talking by the telephone by means of the headset 20, if for example the earphones 25 of the headset 20 and the main body microphone 10 of the digital mobile phone 1 are worked according to the depression of the switch button 30, the user can talk by the telephone without taking off the earphones 25 from his/her ear even if he/she has the digital mobile phone 1 as in talking by the telephone without using the headset 20; the usability can be further improved.

In the aforementioned embodiments, it has dealt with the case where the switch button 30 being a toggle switch is provided on the main body 3 of the digital mobile phone 1 to work either of the earphones 25 and the external microphone 29 or the speaker 6 and the main body microphone 10. However, this invention is not only limited to this but also the above switch button 30 may be provided on the display part 2 of the digital mobile phone 1 or the remote control 23 of the headset 20, or one or plural switch buttons- to work the earphones 25, the external microphone 29, the speaker 6 and the main body microphone 10 by arbitrary combination may be provided on the main body 3 or the display part 2 of the digital mobile phone 1 or the remote control 23 of the headset 20.

An operation button to work them by switching the earphones 25, the external microphone 29, the speaker 6 and the main body microphone 10 may be provided on a predetermined operation screen to be displayed on the LCD 7 of the display part 2 without providing the one or plural mechanical switch buttons on the digital mobile phone 1, the earphones 25, to arbitrary work the external microphone 29, the speaker 6 and the main body microphone 10 by selectively specifying that operation button with the operation keys or the jog dial.

In the aforementioned embodiments, it has dealt with the case where the earphones 25 and the external microphone 29 or the speaker 6 and the main body microphone 10 are worked by switching according to the depressing operation of the switch button 30. However, this invention is not only limited to this but also the earphones 25, the external microphone 29, the speaker 6 and/or the main body microphone 10 which should be worked when a call came in the state where the plug 21 of the headset 20 is inserted into the earphone jack 16 may be previously set on a specified setting screen to be displayed on the LCD 7 of the display part 2 to be automatically switched according to that setting when a call came.

Furthermore, in the aforementioned embodiments, it has dealt with the case where the depressing operation of the switch button 30 is accepted from a time point that a call came in the state where the plug 21 of the headset 20 is inserted into the earphone jack 16 until the call by that call incoming is finished. However, this invention is not only limited to this but also by enabling a call originating from the user to the other party also by the remote control 23 of the headset 20, the earphones 25, the external microphone 29, the speaker 6 and/or the main body microphone 10 may be worked by switching also while the user is talking by the telephone by such call originating from the user to the other party by means of the headset 20, or the speaker 6 or the earphones 25 may be worked by arbitrary switching them when predetermined sound such as music is emitted via the earphones 25 of the headset 20.

In this connection, if the speaker 6 or the earphones 25 is worked by arbitrary switching them when predetermined sound such as music is emitted via the earphones 25 of the headset 20, another person can easily listen to the sound such as the music that the user is listening by the earphones 25, via the speaker 6 without handing the person that earphones.

In the aforementioned embodiments, it has dealt with the case where if a call came while the user is listening to music by means of the headset 20, the earphones 25, the external microphone 29, the speaker 6 and/or the main body microphone 10 are worked by switching. However, this invention is not only limited to this but also the earphones 25, the external microphone 29, the speaker 6 and/or the main body microphone 10 may be worked by switching when a call came while the user is listening to sound based on the other various audio signals such as the voice of the other party obtained by reproducing recorded answering message, a ring melody of user's own composition, by means of the headset 20.

Furthermore, in the aforementioned embodiments, it has dealt with the case where this invention is applied to the digital mobile phone 1 shown in FIGS. 1 to 5. However, this invention is not only limited to this but also it is widely applicable to the other various portable wireless terminals such as a mobile phone having radio program receiving function or television broadcasting receiving function, short distance radio communication technology such as a transceiver, Bluetooth, personal distance assistance (PDA) applying predetermined long distance radio communication technology, provided that a portable wireless terminal in that a receive voice signal can be outputted to earphones or a send voice signal can be taken in from an external microphone.

In the aforementioned embodiments, it has dealt with the case where the audio CODEC 49 is adopted as signal output means for outputting an audio signal to the speaker or outputting a sound signal to the earphones from the earphone jack via the plug. However, this invention is not only limited to this but also the other various signal output means can be widely applied, provided that it can output an audio signal to a speaker or can output an audio signal to earphones from an earphone jack via a plug.

In the aforementioned embodiments, it has dealt with the case where the main control part 40 is adopted as control means for controlling the signal output means to output an arbitrary audio signal or another audio signal to specified speaker and/or earphones at arbitrary timing when an arbitrary audio signal is being outputted to the speaker and/or the earphones. However, this invention is not only limited to this but also the other various control means can be widely applied, provided that it can control the signal output means to output an arbitrary audio signal or another audio signal to specified speaker and/or earphones at arbitrary timing when arbitrary audio signal is being outputted to the speaker and/or earphones.

In the aforementioned embodiments, it has dealt with the case where the transmitter-receiver part 51 and the antenna 5 are adopted as sending/receiving means for sending the send voice signal of user's voice and receiving the receive voice signal of the voice of the other party for call as an audio signal. However, this invention is not only limited to this but also the other various sending/receiving means can be widely applied by matching to a communication mode adopted in a portable wireless terminal, provided that it can send the send voice signal of user's voice and can receive the receive audio signal of the voice of the other party for call as an audio signal.

In the aforementioned embodiments, it has dealt with the case where the recording/reproducing part 47 is adopted as reproducing means for reproducing a music signal from a specified recording medium in that the music signal has been recorded as an audio signal. However, this invention is not only limited to this but also the other various reproducing means corresponding to recording mediums to be used can be widely applied, provided that it can reproduce a music signal from a specified recording medium in that the music signal has been recorded as an audio signal.

In the aforementioned embodiments, it has dealt with the case where the memory stick 13 is adopted as a specified recording medium in that a music signal has been recorded as an audio signal. However, this invention is not only limited to this but also the other various recording mediums such as the internal memory of a portable wireless terminal can be widely applied.

In the aforementioned embodiments, it has dealt with the case where the switch button 30 is adopted as output specification means to enter an output specification command to specify a speaker or earphones to output a receive voice signal. However, this invention is not only limited to this but also the other various output specification means such as a predetermined input screen to be displayed on the LCD 7 of the display part 2 or a detection switch for detecting the open/close operation of the main body 3 and the display part 2 or the like can be widely applied, provided that it can input an output specification command to specify a speaker or earphones to output a receive voice signal.

In the aforementioned embodiments, it has dealt with the case where the audio CODEC 49 is adopted as signal fetching means for fetching a send voice signal obtained by picking up user's voice by the main body microphone or fetching a send voice signal obtained by picking up user's voice by the external microphone connected to the plug inserted into the earphone jack along with the earphones. However, this invention is not only limited to this but also the other various signal fetching means can be widely applied, provided that it can fetch a send voice signal obtained by picking up user's voice by a main body microphone or can fetch a send voice signal obtained by picking up user's voice by an external microphone connected to a plug inserted into an earphone jack along with earphones.

Furthermore, in the aforementioned embodiments, it has dealt with the case where the switch button 30 is adopted as microphone specification means to input a microphone specification command to specify the main body microphone or the external microphone to pick up user's voice. However, this invention is not only limited to this but also the other various microphone specification means such as a predetermined input screen to be displayed on the LCD 7 of the display part 2, a detection switch for detecting the open/close operation of the main body 3 and the display part 2 or the like can be widely applied, provided that it can input a microphone specification command to specify a main body microphone or an external microphone to pick up user's voice.

According to this invention as described above, a portable wireless terminal provides a speaker for emitting a sound based on a predetermined audio signal, an earphone jack to insert so as to be able to pull out, a plug connected to earphones that emits the sound based on the above audio signal, signal output means for outputting the audio signal to the speaker or outputting the audio signal from the earphone jack to the earphones via the plug, and control means for controlling the signal output means to output an arbitrary audio signal or the another audio signal to specified speaker and/or earphones at arbitrary timing when in outputting the arbitrary audio signal to the speaker and/or the earphones. Thereby, when an audio signal is being outputted to the speaker and/or the earphones, the audio signal can be outputted to the desired speaker and/or earphones arbitrary selected by switching without pulling the plug out of the earphone jack. Thus, the usability of a portable wireless terminal can be improved.

Furthermore, a portable wireless terminal provides a main body microphone for picking up user's voice for call, an earphone jack to insert to be able to pull out, a plug connected to an external microphone for picking up the user's voice similarly to that, signal fetching means for fetching a send voice signal obtained by picking up user's voice by the main body microphone, or fetching a send voice signal obtained by picking up the user's voice by the earphones, and control means for controlling the signal fetching means to fetch the send voice signal obtained by picking up the user's voice by the arbitrary main body microphone and/or external microphone when the plug is inserted into the earphone jack. Thereby, user's voice can be picked up for call via the main body microphone without pulling the plug out of the earphone jack. Thus, the usability of a portable wireless terminal can be improved.

INDUSTRIAL UTILIZATION

The present invention can be applied to portable telephones, transceivers, personal computers, PDAs.

The invention claimed is:
1. A portable wireless terminal, comprising:
a mobile unit; and
a connectable unit, including:
  a plug that is connectable to said mobile unit, and
  at least one earphone for emitting sound based on a first audio signal and being connected to said plug via a cable;
said mobile unit including:
  a speaker for emitting sound based on the first audio signal, an earphone jack removably connectable to said plug of said connectable unit, signal output means for outputting the first audio signal to said speaker if said plug of said connectable unit is not connected to said earphone jack of said mobile unit and for outputting the first audio signal to said at least one earphone via said earphone jack and said plug if said plug of said connectable unit is connected to said earphone jack of said mobile unit, control means for providing the first audio signal to said signal output means and, during a telephone call, for controlling said signal output means to output, instead of the first audio signal, another audio signal to one of said speaker and said at least one earphone, sending/receiving means for sending an outgoing voice signal of a user's voice during the telephone call and for receiving an incoming voice signal of a voice of another party of the telephone call, the incoming voice signal being the another audio signal, and reproducing means for reproducing a music signal from a recording medium as the first audio signal;

said connectable unit further including:

a remote control unit connected to said removable plug and to said at least one earphone via portions of said cable, said remote control unit including:

an on-hook/off-hook switch for answering when the telephone call is an incoming telephone call, and a music play/stop switch for starting and stopping the reproduction of the music signal by said reproducing means;

said mobile unit further including:

a call originating key, and toggle switching means controlled by a user for directing said control means during the telephone call to control said signal output means to output the incoming voice signal to said at least one earphone when said toggle switching means is in a first position and said plug of said connectable unit is connected to said earphone jack of said mobile unit, and for directing said control means during the telephone call to control said signal output means to output the incoming voice signal to said speaker without requiring disconnection of said plug of said connectable unit from said earphone jack of said mobile unit when said toggle switching means is in a second position, said toggle switching means being prevented from redirecting the music signal from said at least one earphone to said speaker while said signal output means outputs the music signal and said plug of said connectable unit is connected to said earphone jack of said mobile unit;

whereby if said plug of said connectable unit is connected to said earphone jack of said mobile unit and the incoming telephone call arrives while the music signal is being reproduced by said reproducing means, said control means controls said signal output means to superimpose on the music signal a tone associated with the incoming call, then when said on-hook/off-hook switch of said remote control unit or said call originating key of said mobile unit is activated, said control means controls said reproducing means to stop reproducing the music signal and controls said signal output means to output the received incoming voice signal to said at least one earphone of said connectable unit if said toggle switching means is in the first position and to output the received incoming voice signal to said speaker of said mobile unit if said toggle switching means is in the second position, and then if said toggle switching means is in the first position and is changed to the second position, said control means controls said signal output means to redirect the received incoming voice signal from being outputted to said at least one earphone of said connectable unit to being outputted to said speaker of said mobile unit without requiring disconnection of said plug of said connectable unit from said earphone jack of said mobile unit, and if said toggle switching means is in the second position and is changed to the first position, said control means controls said signal output means to redirect the received incoming voice signal from being outputted to said speaker of said mobile unit to being outputted to said at least one earphone of said connectable unit.

2. The portable wireless terminal according to claim 1, wherein said remote control unit further includes:

an external microphone for picking up the user's voice to generate the outgoing voice signal; and said mobile unit further includes:

a main body microphone for picking up the user's voice to generate the outgoing voice signal, and signal fetch means for fetching the outgoing voice signal generated by said main body microphone for delivery to said sending/receiving means and for fetching the outgoing voice signal generated by said external microphone in said remote control unit for delivery to said sending/receiving means, whereby when said plug of said connectable unit is connected to said earphone jack of said mobile unit and the incoming telephone call arrives while the music signal is being reproduced and then said on-hook/off-hook switch of said remote control unit or said call originating key of said mobile unit is activated, said control means controls said signal fetch means to fetch the outgoing voice signal generated by said main body microphone without requiring disconnection of said plug of said connectable unit from said earphone jack of said mobile unit if said toggle switching means is in the second position and to fetch the outgoing voice signal generated by said external microphone if said toggle switching means is in the first position.

3. The portable wireless terminal according to claim 2, wherein when said toggle switching means is in the first position and is changed to the second position, said control means redirects said signal fetch means to fetch the outgoing voice signal generated by said main body microphone without requiring disconnection of said plug of said connectable unit from said earphone jack of said mobile unit, and when said toggle switching means is in the second position and is changed to the first position, said control means redirects said signal fetch means to fetch the outgoing voice signal generated by said external microphone.

4. A portable wireless terminal comprising:

a mobile unit; and a connectable unit, including:

a plug that is connectable to said mobile unit, and a remote control unit connected to said plug via a cable, and including:

an external microphone for picking up a user's voice to generate an outgoing voice signal during a telephone call, and an on-hook/off-hook switch for answering when the telephone call is an incoming call;

said mobile unit including:

a main body microphone for picking up the user's voice to generate the outgoing voice signal, a jack removably connectable to said plug of said connectable unit, signal fetch means f or fetching the outgoing voice signal generated by said main body microphone and for fetching the outgoing voice signal generated by said external microphone when said plug is inserted into said jack, control means for controlling said signal fetch means to fetch the outgoing voice signal generated by said arbitrary main body microphone or to fetch the outgoing voice signal generated by said external microphone, sending/receiving means for sending the outgoing voice signal fetched by said signal fetch means and for receiving the incoming voice signal, reproducing means for reproducing a music signal from a recording medium, a call originating key, and toggle switching means controlled by a user for directing, during the telephone call, said control means to control said signal fetch means to fetch the outgoing voice signal generated by said external microphone when said toggle switching means is in a first position and said plug of said connectable unit is connected to said jack of said mobile unit, and for directing said control means to control said signal fetch means to fetch the outgoing voice signal generated by said main body microphone without requiring disconnection of said plug of said connectable unit from said jack of said mobile unit when said toggle switching means is in a second position;

whereby if said plug of said connectable unit is connected to said jack of said mobile unit and an incoming telephone call arrives while the music signal is being reproduced by said reproducing means, said control means causes a tone associated with the incoming call to be superimposed on the music signal, then when said on-hook/off-hook switch of said remote control unit or said call originating key of said mobile unit is activated, said control means controls said reproducing means to stop reproducing the music signal and controls said signal fetch means to fetch the outgoing voice signal generated by said external microphone if said toggle switching means is in the first position and to fetch the outgoing voice signal generated by said main body microphone if said toggle switching means is in the second position, and then if said toggle switching means is in the first position and is changed to the second position, said control means redirects said signal fetch means to fetch the outgoing voice signal generated by said main body microphone without requiring disconnection of said plug of said connectable unit from said jack of said mobile unit, and if said toggle switching means is in the second position and is changed to the first position, said control means redirects said signal fetch means to fetch the outgoing voice signal generated by said external microphone;

said connectable unit further including:

at least one earphone for emitting sound based on an audio signal and being connected to said plug via said cable;

said mobile unit further including:

a speaker for emitting sound based on the audio signal, and signal output means for outputting at least one of the reproduced music signal and the incoming voice signal to said speaker if said plug of said connectable unit is not connected to said jack of said mobile unit or to said at least one earphone via said plug inserted and said jack if said plug of said connectable unit is connected to said jack of said mobile unit, said toggle switching means being prevented from redirecting the music signal from said at least one earphone to said speaker while said signal output means outputs the music signal and said plug of said connectable unit is connected to said jack of said mobile unit;

whereby when said plug of said connectable unit is connected to said jack of said mobile unit and the incoming telephone call arrives while the reproduced music signal is being outputted to said at least one earphone by said signal output means, said control means controls said output means to superimpose on the music signal the tone associated with the incoming call, then when said on-hook/off-hook switch of said remote control unit or said call originating key of said mobile unit is activated, said control means controls said signal fetch means to fetch the outgoing audio signal generated by said main body microphone, controls said reproducing means to stop reproducing the music signal, and controls said signal output means to output the received incoming voice signal to said speaker of said mobile unit without requiring disconnection of said plug of said connectable unit from said jack of said mobile unit if said toggle switching means is in the second position, and said control means controls said signal fetch means to fetch the outgoing audio signal generated by said external microphone and controls said reproducing means to output the received incoming voice signal to said at least one earphone of said connectable unit if said toggle switching means is in the first position.

* * * * *

UNITED STATES PATENT AND TRADEMARK OFFICE
CERTIFICATE OF CORRECTION

PATENT NO. : 7,254,415 B2
APPLICATION NO. : 10/240964
DATED : August 7, 2007
INVENTOR(S) : Haruhiko Okamura It is certified that error appears in the above-identified patent and that said Letters Patent is hereby corrected as shown below:

Column 19, line 11, claim 4, "f or" should read --for--.

Signed and Sealed this

Twenty-ninth Day of July, 2008

JON W. DUDAS
*Director of the United States Patent and Trademark Office*